United States Patent [19]
Ushiyama et al.

[11] 4,202,009
[45] May 6, 1980

[54] PROCESSING AMPLIFIER FOR THREE-TUBE COLOR TELEVISION CAMERA

[75] Inventors: Yasuichi Ushiyama; Setsuo Yamamoto, both of Toyko, Japan

[73] Assignee: Nippon Electric Co., Ltd., Tokyo, Japan

[21] Appl. No.: 930,269

[22] Filed: Aug. 2, 1978

[30] Foreign Application Priority Data

Aug. 3, 1977 [JP] Japan .................................. 52/93506

[51] Int. Cl.² ........................................... H04N 9/53
[52] U.S. Cl. .................................................. 358/32
[58] Field of Search ................... 358/21, 32, 34, 160, 358/164, 170, 171, 172

[56] References Cited

U.S. PATENT DOCUMENTS

| 3,126,447 | 3/1964 | Bendell | 358/34 |
| 4,110,787 | 8/1978 | Parker | 358/34 |

Primary Examiner—Richard Murray
Attorney, Agent, or Firm—Sughrue, Rothwell, Mion, Zinn and Macpeak

[57] ABSTRACT

In order to stabilize the black level in the red, green or blue channel, black pulses are inserted during a blanking period and are of a level slightly higher than the black level. The resulting color signal is clamped in a first clamping circuit to a predetermined voltage during that part of the blanking period which is free of the black pulse inserted therein, and, after being processed for white compression, black clipping or gamma correction, is provided to a second clamping circuit for fixing the clamping point at a definite and preselected voltage. The black pulse level of the output from the second clamping circuit is compared with a reference voltage and, upon the result obtained, the clamp voltage of the first clamping circuit is controlled to thereby completely suppress black level variations. With this processing amplifier device, the pedestal level is adjustable by varying either the reference voltage or the level of the black pulses.

5 Claims, 4 Drawing Figures

PROCESSING AMPLIFIER FOR THREE-TUBE COLOR TELEVISION CAMERA

BACKGROUND OF THE INVENTION

This invention relates to processing amplifiers for three-tube color television cameras and, more particularly, to an improved form of such processing amplifier which is designed to stabilize the black level of the video signal output of an image pickup tube.

In a processing amplifier of a color television camera, corrections such as shading correction, white compression, gamma correction and black clipping are effected on the video signal output from the preamplifier circuit. Particularly, in a three-tube color television camera, any black level variations in the red, blue and green color channels have generally resulted in black images in the video output from the color encoder which are not perfectly black, but are slightly colored. This is accounted for by the facts that the characteristics of circuits elements such as diodes and transistors used in the gamma correction and black clipping circuits are variable with temperature and that, particularly in the gamma correction circuit, the variations are emphasized in the vicinity of the black level because of the gamma correction characteristics. Accordingly, circuit arrangements having substantial temperature stability have long been demanded, particularly for gamma correction and black clipping circuits, which have a large influence on the signal level in the vicinity of the black level. Measures previously taken to increase the stability of the pedestal level have been to provide the clamping circuit with appropriate temperature compensating means or, as disclosed in Paper No. 4-3 of the *Proceedings of The 1976 National Convention of the Institute of Television Engineers of Japan*, entitled "Development of a One-Package IC Processing Amplifier for Broadcasting Use", to arrange a feedback clamping circuit on the input side of the gamma correction circuit. Such measures, however, have not been effective fully to suppress the signal variations and, in addition, have involved an inconvenience in that a substantial amount of time is required for their adjustment.

SUMMARY OF THE INVENTION

The present invention has for its object the provision of an improved processing amplifier device for a three-tube color television camera which is capable of fully stabilizing the black level.

According to the present invention, there is provided a processing amplifier device for a three-tube color television camera which comprises black-pulse mixing means operable to add black pulses of a predetermined level to the video signal during a part of the blanking period, a first clamping circuit operable to clamp the output from said black-pulse mixing means to a predetermined voltage during that part of the added blanking period which is free of the black pulses, a correction circuit for effecting white compression, a circuit for providing black clipping or gamma correction on the output from said first clamping circuit, a second clamping circuit operable to clamp the output from said correction circuit to a predetermined voltage at the clamping point of said first clamping circuit, a comparison circuit for comparing the level of black pulses in the output from said second clamping circuit with a reference voltage, and a feedback loop arranged to control the clamp voltage of said first clamping circuit in accordance with the output of said comparison circuit.

In the processing amplifier of the present invention, the video signal is mixed with black pulses in the blanking period which are of a level slightly above the black level. The level of black pulses in the signal provided by the gamma correction or black clipping circuit is detected and fed back to the signal path at a point after of the gamma correction or black clipping circuit so that such black pulses are maintained at such level desired level. In this manner, the gamma correction and black clipping circuits can be effectively stabilized in a wide range without any adjustment.

The above and other objects, features and advantages of the present invention will become apparent from the following description when taken in conjunction with the accompanying drawings.

DESCRIPTION OF THE PREFERRED EMBODIMENTS

Figure 1:
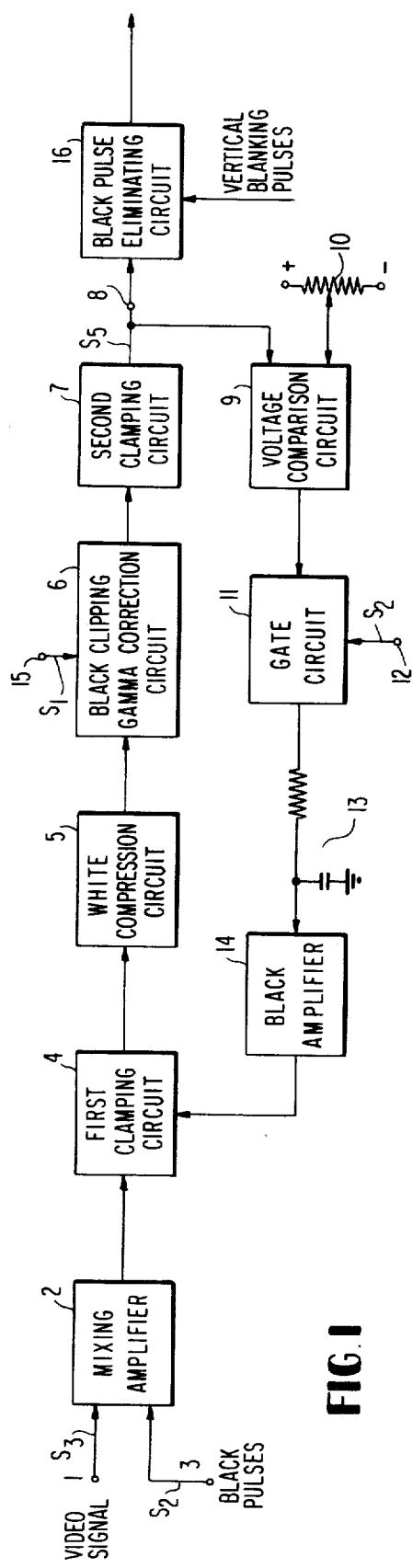
FIG. 1 is a schematic block diagram of a preferred form of the processing amplifier device embodying the present invention.
Figure 2:
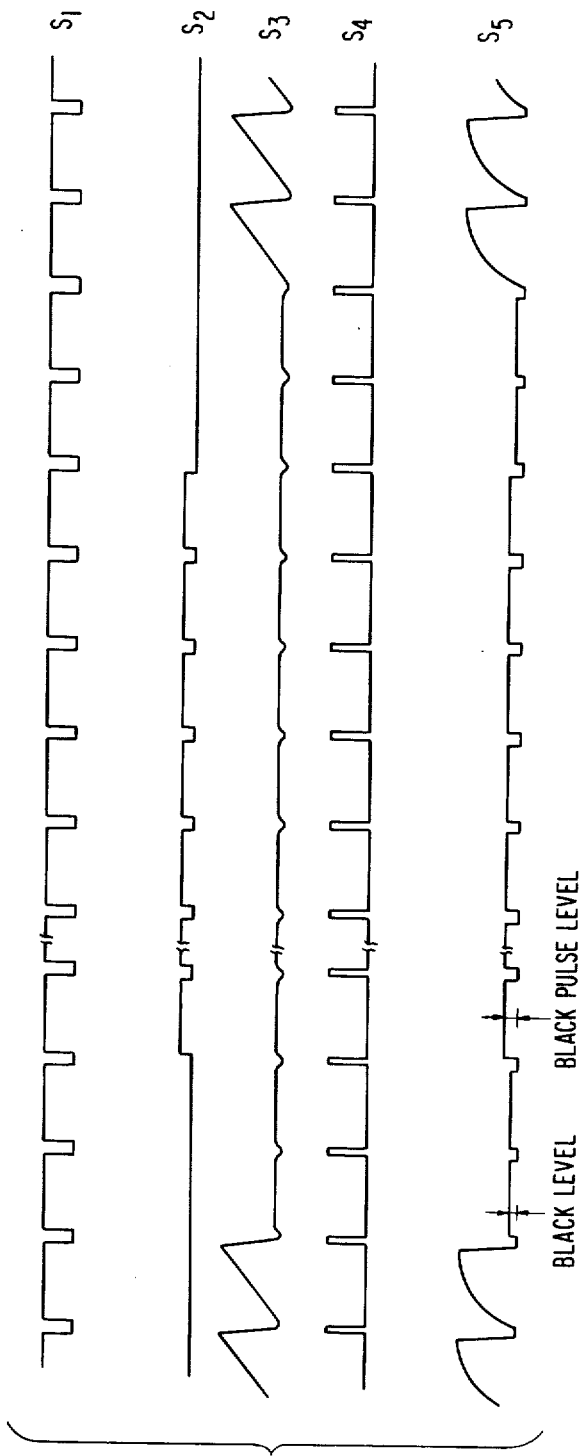
FIG. 2 is a graph showing waveforms of signals appearing at respective circuit notes in FIG. 1.

Referring first to FIGS. 1 and 2, which illustrate a preferred embodiment of the present invention, the video signal $S_3$ coming through a terminal 1 is mixed in a mixing amplifier circuit 2 with black pulses $S_2$, which are fed through another terminal 3. In this embodiment, the black pulses $S_2$ are added during the vertical blanking period, as is readily seen in FIG. 2. The black pulses $S_2$ are set at a level slightly above the black level, having a height corresponding to 20% of the maximum amplitude of the video signal $S_3$. In a first clamping circuit 4, the signal level during the horizontal blanking period is fixed in accordance with the output of a buffer amplifier 14 at the timing of clamp pulses $S_4$. The output of the first clamping circuit 4 is directed through a white compression circuit 5 and a black clipping and gamma correction circuit 6 a second clamping circuit 7, where the video signal is fixed at a preselected voltage level, for example, at zero volt, during the horizontal blanking period. It is to be understood that the clamp pulses $S_4$ are also employed by the second clamping circuit 7. The video signal output $S_5$ from the second clamping circuit 7 is provided to a terminal 8, and is simultaneously fed to a voltage comparison circuit 9 for comparison with a reference voltage formed by potentiometer means 10 and having a level corresponding to the level of black pulses contained in the video signal $S_5$. The output voltage from the voltage comparison circuit 9 is extracted at a gate circuit 11 only when black pulses $S_2$ exist, and is fed to a holding circuit 13 including a resistance and a capacitor. Gate pulses are fed to the gate circuit 11 through a terminal 12 and are quite similar in timing and amplitude to the black pulses $S_2$. The output from the holding circuit 13 is fed through a buffer amplifier 14 to the first clamping circuit 4 to control the clamp voltage. The black clipping and gamma correction circuit 6 is provided with blanking pulses $S_1$ through a terminal 15. In this instance, the blanking pulses $S_1$ consist only of those for the horizontal blanking period, and do not include vertical blanking pulses. The black pulses contained in the video signal $S_5$ are finally eliminated at the blank pulse elimination circuit 16.

With the arrangement described above, the black pulse level of the video output signal $S_5$ and the reference voltage signal from potentiometer 10 are at all times compared with each other in comparison circuit 9, and the output of the latter is fed back to the first clamping circuit 4 so as to make the black pulse level equal to the reference voltage. In this manner, the black pulse level and the actual black level, which are variable only in direct proportion to each other, can be held fixed independently from temperature variations.

The black pulse level is set slightly above the black level, as described previously. The reason for this is because, in cases where the black level and the pedestal level are set at one and the same level, it is meaningless to detect the black or pedestal level to form thereon a feedback loop aimed to make such a level fixed. As is well known, in the NTSC system as employed in Japan, the pedestal level is set closer to the lower black limit than to the black level. In comparison, in the NTSC system as employed in the United States of America and in the PAL system used in European nations, the pedestal level is made equal to the black level at the processing amplifier, thus making it absolutely necessary to mix black pulses of a level higher than the pedestal level.

Figure 3:
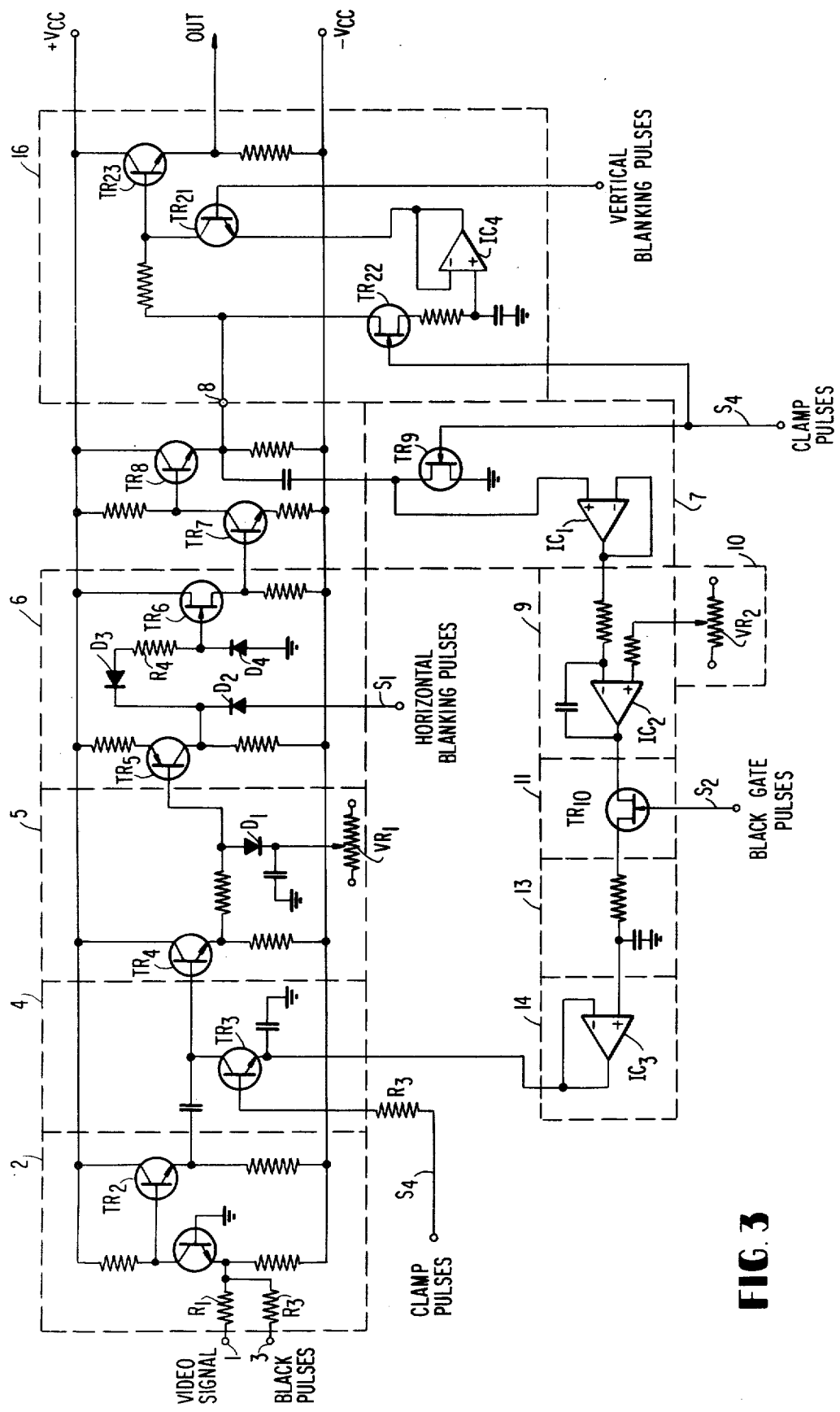
FIG. 3 is a detailed circuit diagram showing the construction of the embodiment of FIG. 1.

Referring to FIG. 3, which is a detailed circuit diagram of the embodiment described above, the video signal input $S_3$ is fed through a resistance $R_1$ and the black pulses input $S_2$ are fed through a resistance $R_2$, and are mixed in a grounded base amplifier circuit of transistor $TR_1$, the output of which is extracted through the next stage transistor $TR_2$ at its emitter terminal to be fed to a first clamping circuit 4 including a transistor $TR_3$. In this clamping circuit 4, the clamping point in the horizontal blanking period is clamped to the output voltage of an operating amplifier $IC_3$ as clamp pulses are fed to the circuit 4 through a resistance $R_3$. The mixed video output clamped in this manner is extracted at a transistor $TR_4$ at its emitter terminal, and is then subjected to white compression by diode means $D_1$. The cathode potential of diode $D_1$ is controllable by means of a potentiometer $VR_1$, which allows adjustment of the level of white compression. The white-compressed signal is amplified at a transistor $TR_5$, and blanking pulses are added through a diode $D_2$ to the amplified signal at the anode of diode $D_3$, which is subsequently black-clipped at a diode $D_3$. The resulting signal is fed to a gamma correction circuit consisting of a resistance $R_4$ and a diode $D_4$ that utilizes the forward voltage-to-current characteristic of diode $D_4$. The processed, mixed video signal from the gamma correction circuit is amplified by a field-effect transistor $TR_6$ in the source follower configuration, is further amplified by transistors $TR_7$ and $TR_8$ and is outputted to the black pulse elmination circuit 16 through the emitter terminal of the transistor $TR_8$. This video signal from the transistor $TR_8$ is clamped to the zero volt level during the horizontal blanking period by means of a second clamping circuit 7 which employs a field-effect transistor $TR_9$ and an operational amplifier $IC_1$ and is practically free from variations in clamp voltage. The output from the operational amplifier $IC_1$ is provided to a voltage comparison circuit 9 which employs an operational amplifier $IC_2$, for comparison with a reference voltage formed by a potentiometer $VR_2$. The comparator output is gated through a field-effect transistor $TR_{10}$ only during the black pulse period, and is then directed through a holding circuit 13 formed of a resistor and a capacitor and through a buffer amplifier circuit 14 having an operational amplifier $IC_3$ to the emitter terminal of the transistor $TR_3$. With this feedback arrangement, it is to be appreciated that the black pulses are always held at a fixed level under the effect of the feedback loop formed: In other words, the black pulse level and hence the black level of the video signal are stabilized independently from voltage variations between the collector and emitter of transistor $TR_3$ and from variations in forward voltage of diode $D_3$. Incidentally, the setup or pedestal level can be adjusted by adjusting potentiometer $VR_2$.

The video signal which appears at the emitter of the transistor $TR_8$, and which includes the black pulses mixed, is then subjected to the black pulse elimination at a clamping circuit comprising a transistor $TR_{21}$. In this clamping circuit, the signal level for the vertical blanking periods which contain the black pulses, is clamped to the pedestal level. The pedestal level is picked up at a field-effect transistor $TR_{22}$ and is supplied to the emitter of the transistor $TR_{21}$ through a buffer amplifier $IC_9$, while the vertical blanking pulses are supplied to the base of the transistor $TR_{21}$. The video signal with the black pulses thus eliminated is supplied to the output terminal through a transistor $TR_{23}$ of emitter follower configuration.

Figure 4:
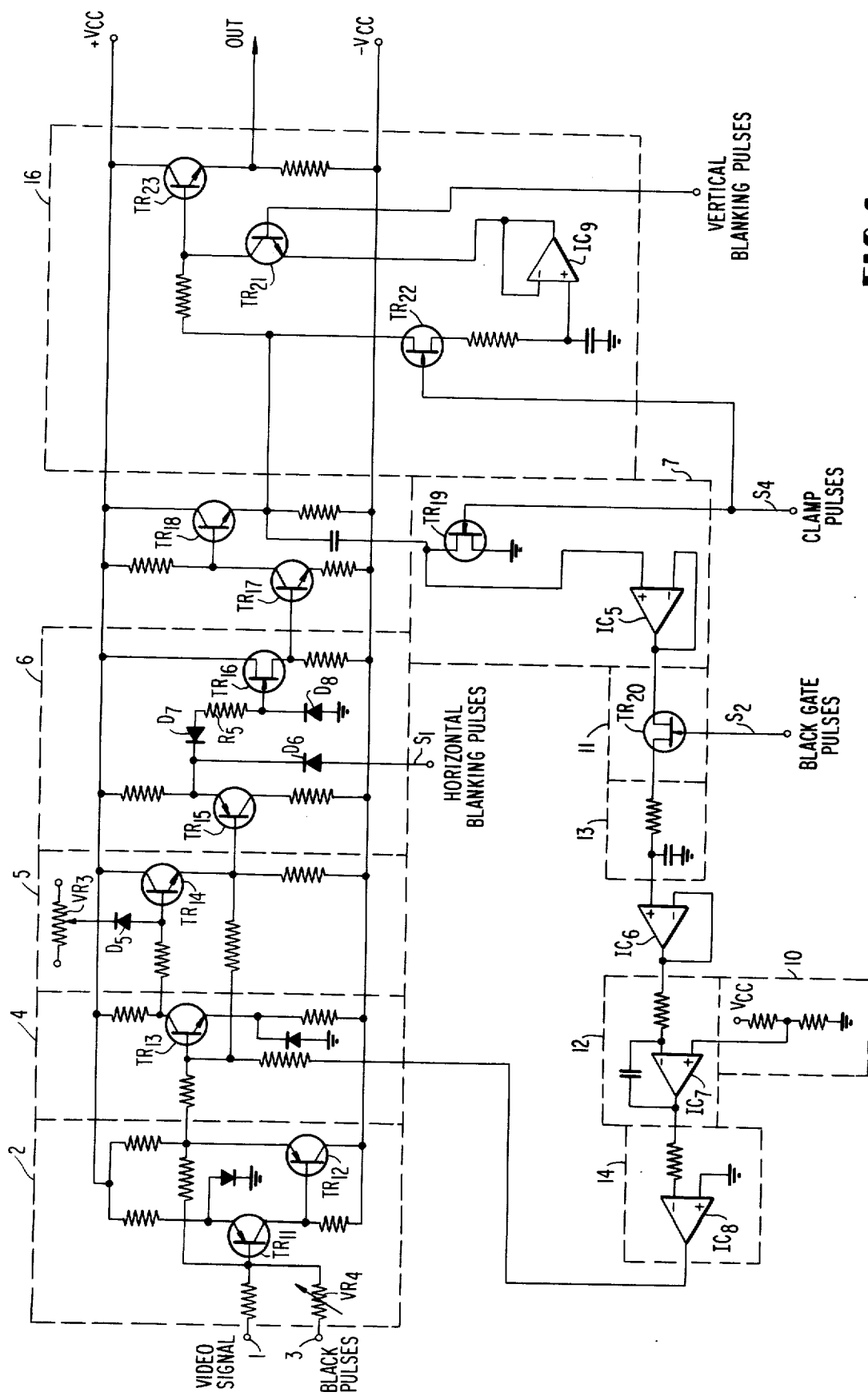
FIG. 4 is a detailed circuit diagram, similar to FIG. 3, illustrating another preferred embodiment of the present invention.

Although, in the embodiment of FIGS. 1 and 3 the output from the second clamping circuit 7 is fed directly to the voltage comparison circuit 9 and the output of the latter is gated in accordance with the black pulses, it will be apparent that it may alternatively be arranged so that the output from the second clamping circuit 7 is first gated in accordance with the black pulses and the gated output is then compared with a reference voltage, as is the case in the embodiment of the present invention shown in FIG. 4.

In the embodiment of FIG. 4, the mixing amplifier circuit 2 for mixing the input video signal with black pulses takes the form of a feedback pair circuit including transistors $TR_{11}$ and $TR_{12}$, the first clamping circuit 4 taking the form of a feedback clamping circuit. The direct-current component required to make the black pulse level equal to the reference voltage is added to the signal from the preceding stage at the base of a transistor $TR_{13}$. The signal extracted from the transistor $TR_{13}$ is white-compressed at a diode $D_5$. The level of white compression is adjustable by a potentiometer $VR_3$. The white-compressed signal is amplified at transistors $TR_{14}$ and $TR_{15}$ and blanking pulses are added to the amplified signal through a diode $D_6$. The signal is then black-clipped at a diode $D_7$ and gamma-corrected in a gamma correction circuit including a resistance $R_5$ and a diode $D_8$. The video signal thus gamma-corrected is provided through a field-effect transistor $TR_{16}$ and a transistor $TR_{17}$ to a transistor $TR_{18}$ to be outputted at its emitter to the black pulse elimination circuit which is similar to the corresponding circuit of FIG. 3. The video signal from the transistor $TR_{18}$ is clamped to the 0 volt level during the horizontal blanking period by a second clamping circuit 7 employing a field-effect transistor $TR_{19}$ and an operational amplifier $IC_5$. The signal extracted from the operational amplifier $IC_5$ is gated at a field-effect transistor $TR_{20}$ so that that portion of the signal which includes black pulses is fed through a holding circuit 13 to an operational amplifier $IC_6$. The output from the operational amplifier $IC_6$ is provided to a voltage comparison circuit 9 employing an operational amplifier $IC_7$ for comparison with the reference voltage. The difference between the black pulse level and the reference voltage is fed to the base of transistor $TR_{13}$ after it has been amplified by a buffer amplifier circuit including an operational amplifier $IC_8$. In the embodiment shown in FIG. 4, the reference voltage employed in the voltage comparison is fixed, and the pedestal level can be varied by varying the level of black pulses inserted in the video signal by means of a variable resistor $VR_4$ of the mixer amplifier 2.

In either embodiments of the present invention discussed above, black pulses are inserted during the vertical blanking period. While the black pulses may be inserted during the horizontal blanking period, if required, insertion during the vertical blanking period is much easier. This is accounted for by the fact that in actual practice the horizontal blanking period of the video signal coming from the image pickup tube and through a preamplifier is of the length of up to 7 microseconds, and the clamp pulse used to clamp this period has a width of about 4 microseconds, leaving only a minor portion of the horizontal blanking period available for the black pulse insertion.

What is claimed is:

1. A processing amplifier device for stabilizing black level in a red, green or blue channel of a three-tube color television camera, said device comprising:

a preamplifier for amplifying a video signal from said channel;

a mixing amplifier circuit operable to mix the output of said preamplifier with black pulses of a predetermined level during a blanking period;

a first clamping circuit for clamping the output of said mixing amplifier circuit to a first predetermined voltage level during that part of the blanking period which is free of the black pulses added thereto;

correction means for effecting black clipping and gamma correction to the output signal of said first clamping circuit;

a second clamping circuit for clamping the output of said correction means to a second predetermined voltage level during said part of the blanking period;

a comparison circuit for comparing the level of said black pulses in the output of said second clamping circuit with a reference voltage; and a feedback loop arranged to control the clamp voltage level of said first clamping circuit in accordance with the output of said comparison circuit.

2. A processing amplifier device as set forth in claim 1, in which said first and second clamping circuits are both operable to insert clamp pulses during the horizontal blanking period.

3. A processing amplifier device as set forth in claim 1, in which said black pulses are added during the vertical blanking period.

4. A processing amplifier device as set forth in claim 1, in which adjustment of the pedestal level is effected by varying said reference voltage.

5. A processing amplifier device as set forth in claim 1, in which adjustment of the pedestal level is effected by varying the level of black pulses added during the blanking period.

* * * * *